(12) United States Patent
Geissenhoener et al.

(10) Patent No.: US 9,120,436 B2
(45) Date of Patent: Sep. 1, 2015

(54) ROOF SHELL STRUCTURE FOR A MOTOR VEHICLE

(71) Applicant: Dr. Ing. h.c. F. Porsche Aktiengesellschaft, Stuttgart (DE)

(72) Inventors: Kai Geissenhoener, Suhl (DE); Lars Schulz, Schoeneiche (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/326,752

(22) Filed: Jul. 9, 2014

(65) Prior Publication Data

US 2015/0015031 A1  Jan. 15, 2015

(30) Foreign Application Priority Data

Jul. 9, 2013 (DE) .......................... 10 2013 107203

(51) Int. Cl.
| | | |
|---|---|---|
| *B60R 13/07* | (2006.01) | |
| *B60R 13/02* | (2006.01) | |
| *B62D 25/06* | (2006.01) | |
| *B62D 29/04* | (2006.01) | |

(52) U.S. Cl.
CPC ......... *B60R 13/0218* (2013.01); *B60R 13/0212* (2013.01); *B62D 25/06* (2013.01); *B62D 29/04* (2013.01)

(58) Field of Classification Search
CPC .................. B62D 25/06; E04B 1/3431; E04B 2001/34892; F17C 2201/052; F17C 2223/0161; B60R 13/0225; B60R 2013/0287; B29C 67/241; B44C 3/048

USPC .......................................... 296/210, 214, 39.1
See application file for complete search history.

(56) References Cited

U.S. PATENT DOCUMENTS

| | | | | | |
|---|---|---|---|---|---|
| 4,352,522 | A | * | 10/1982 | Miller ........................... | 296/214 |
| 5,016,934 | A | * | 5/1991 | Pelz ............................... | 296/214 |
| 5,120,593 | A | * | 6/1992 | Kurihara ....................... | 428/174 |
| 5,258,585 | A | * | 11/1993 | Juriga ............................ | 181/286 |
| 5,536,556 | A | * | 7/1996 | Juriga ............................ | 428/138 |
| 6,048,809 | A | * | 4/2000 | Brow et al. ................... | 442/364 |
| 6,086,145 | A | * | 7/2000 | Wandyez ....................... | 296/214 |
| 6,120,090 | A | * | 9/2000 | Van Ert et al. ................ | 296/211 |
| 6,124,222 | A | * | 9/2000 | Gebreselassie et al. ...... | 442/389 |
| 6,150,287 | A | * | 11/2000 | Boyd et al. ....................... | 442/32 |
| 6,204,209 | B1 | * | 3/2001 | Rozek et al. .................. | 442/374 |
| 6,378,936 | B1 | * | 4/2002 | Grimm et al. ................. | 296/214 |
| 6,413,613 | B1 | * | 7/2002 | Byma ............................ | 428/116 |
| 6,475,937 | B1 | * | 11/2002 | Preisler et al. ................ | 442/370 |
| 6,565,149 | B2 | * | 5/2003 | Pfalzgraf et al. ............. | 296/217 |
| 7,182,832 | B2 | * | 2/2007 | Behnke et al. ................ | 156/320 |

(Continued)

FOREIGN PATENT DOCUMENTS

| | | |
|---|---|---|
| DE | 10022902 | 3/2001 |
| DE | 10340951 | 4/2005 |

(Continued)

*Primary Examiner* — Kiran B Patel
(74) *Attorney, Agent, or Firm* — Gerald E. Hespos; Michael J. Porco; Matthew T. Hespos

(57) ABSTRACT

A roof shell structure for a motor vehicle has a roof shell with an outer shell and an inner roof lining. A sound absorption element is integrated into the roof shell or into the roof shell structure. The sound absorption element is arranged between the outer shell and the inner roof lining in an opening in an inner shell.

5 Claims, 3 Drawing Sheets

(56) References Cited

U.S. PATENT DOCUMENTS

| | | | |
|---|---|---|---|
| RE40,617 E * | 1/2009 | Canni et al. | 296/37.8 |
| 7,490,893 B2 * | 2/2009 | Asbury et al. | 296/214 |
| 2001/0036788 A1 * | 11/2001 | Sandoe et al. | 442/389 |
| 2002/0093225 A1 * | 7/2002 | Grimm | 296/210 |
| 2003/0118806 A1 * | 6/2003 | Schonebeck | 428/304.4 |
| 2003/0155792 A1 * | 8/2003 | Bohm et al. | 296/191 |
| 2003/0168889 A1 * | 9/2003 | Comert et al. | 296/210 |
| 2004/0061358 A1 * | 4/2004 | Vishey et al. | 296/214 |
| 2004/0069564 A1 * | 4/2004 | Wang et al. | 181/293 |
| 2004/0090089 A1 * | 5/2004 | Byma et al. | 296/214 |
| 2004/0094992 A1 * | 5/2004 | Bohm et al. | 296/210 |
| 2004/0097159 A1 * | 5/2004 | Balthes et al. | 442/415 |
| 2004/0174049 A1 * | 9/2004 | Byma et al. | 296/214 |
| 2004/0198123 A1 * | 10/2004 | Gillingham et al. | 442/327 |
| 2006/0103172 A1 * | 5/2006 | Veen et al. | 296/214 |
| 2008/0185877 A1 | 8/2008 | Sommer | |
| 2010/0065366 A1 * | 3/2010 | Soltau et al. | 181/286 |

FOREIGN PATENT DOCUMENTS

| | | |
|---|---|---|
| DE | 10 2010 012826 | 9/2011 |
| DE | 20 2012 101 934 | 9/2012 |
| DE | 20 2012 104 315 | 1/2013 |

* cited by examiner

US 9,120,436 B2

ROOF SHELL STRUCTURE FOR A MOTOR VEHICLE

CROSS REFERENCE TO RELATED APPLICATION

This application claims priority under 35 USC 119 to German Patent Appl. No. 10 2013 107 203.8 filed on Jul. 9, 2013, the entire disclosure of which is incorporated herein by reference.

BACKGROUND

1. Field of the Invention

The invention relates to a roof shell structure for a motor vehicle.

2. Description of the Related Art

DE 20 2012 101 934 U1 discloses a vehicle body part that comprises a material composite having a support and an outer skin, The outer skin is produced from a CFRP (carbon fiber reinforced plastics) material. DE 103 40 951 B4 discloses a roof for a vehicle, that consists of plastics material and has a lining on an inner side facing toward the passenger compartment. The lining consists of a plastics material and is configured as insulation.

It is an object of the invention to create a roof shell structure for a motor vehicle, where the roof shell structure is lightweight and meets high room acoustic requirements.

SUMMARY OF THE INVENTION

The invention relates to a roof shell structure configured so that noise or acoustic energy in the compartment can be dissipated or reduced as far as possible by providing a sound absorption element in the roof shell structure. More particularly, the sound absorption element is integrated into the roof shell or into the roof shell structure, and preferably is arranged between an outer shell and an inner roof lining of the structure.

The sound absorption element preferably is connected to an inner shell that is arranged between the outer shell and the inner roof lining. The sound absorption element is mounted within an approximately central opening in the inner shell and is held on surrounding edges of the opening.

The sound absorption element may be embodied as a sheet and in a region of the inner shell opening may have an indentation with through-holes or perforations distributed regularly over the opening. Seals preferably are fastened in holding strips to achieve sealing between the sheet-like sound absorption element and the inner shell.

The outer shell, the inner shell and the holding strips preferably are produced from a CFRP material and are bonded adhesively to one another by an RTM (resin transfer molding) process to achieve a lightweight and stable roof shell structure.

The inner roof lining may have a headliner material in the manner of a textile lining. Deformation elements made of the headliner material may be arranged on the inner roof lining.

An exemplary embodiment of the invention is illustrated in the drawings and described in more detail in the following text.

DETAILED DESCRIPTION OF THE PREFERRED EMBODIMENT

Figure 1:
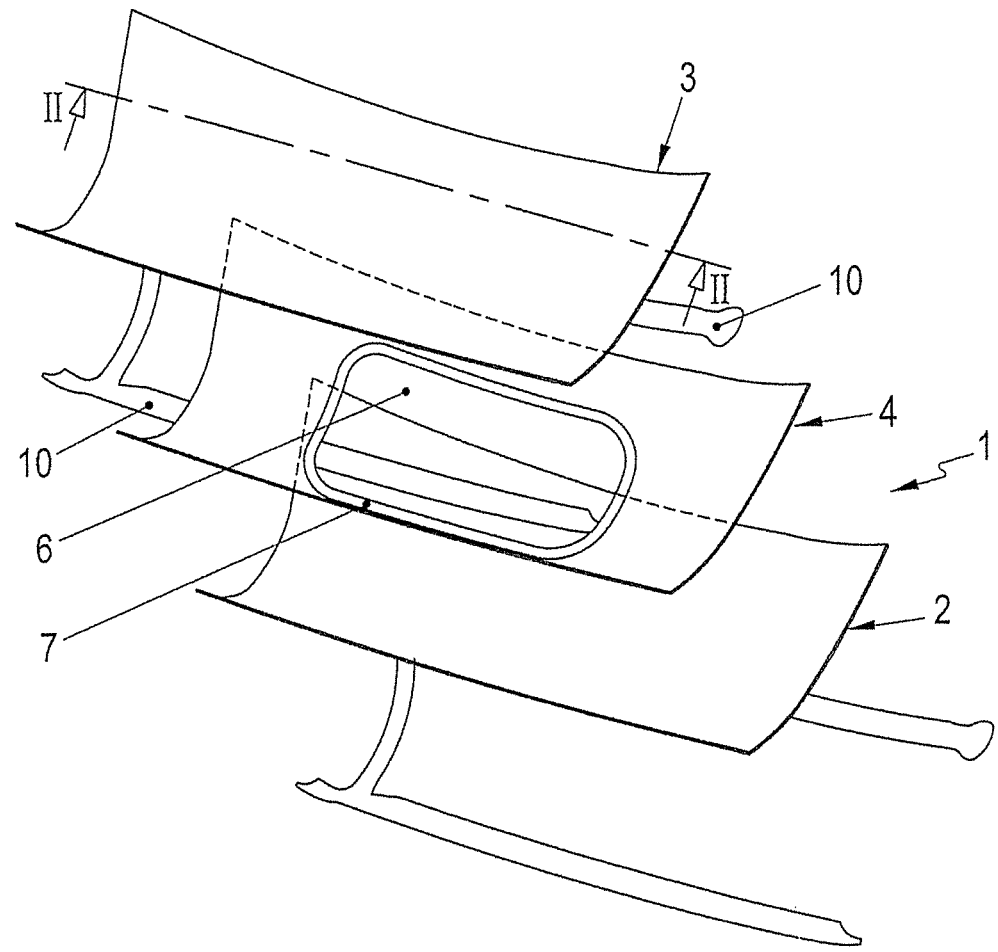
FIG. 1 is a diagrammatic illustration of a roof shell structure having an outer shell, an inner shell and an inner roof lining.
Figure 2:
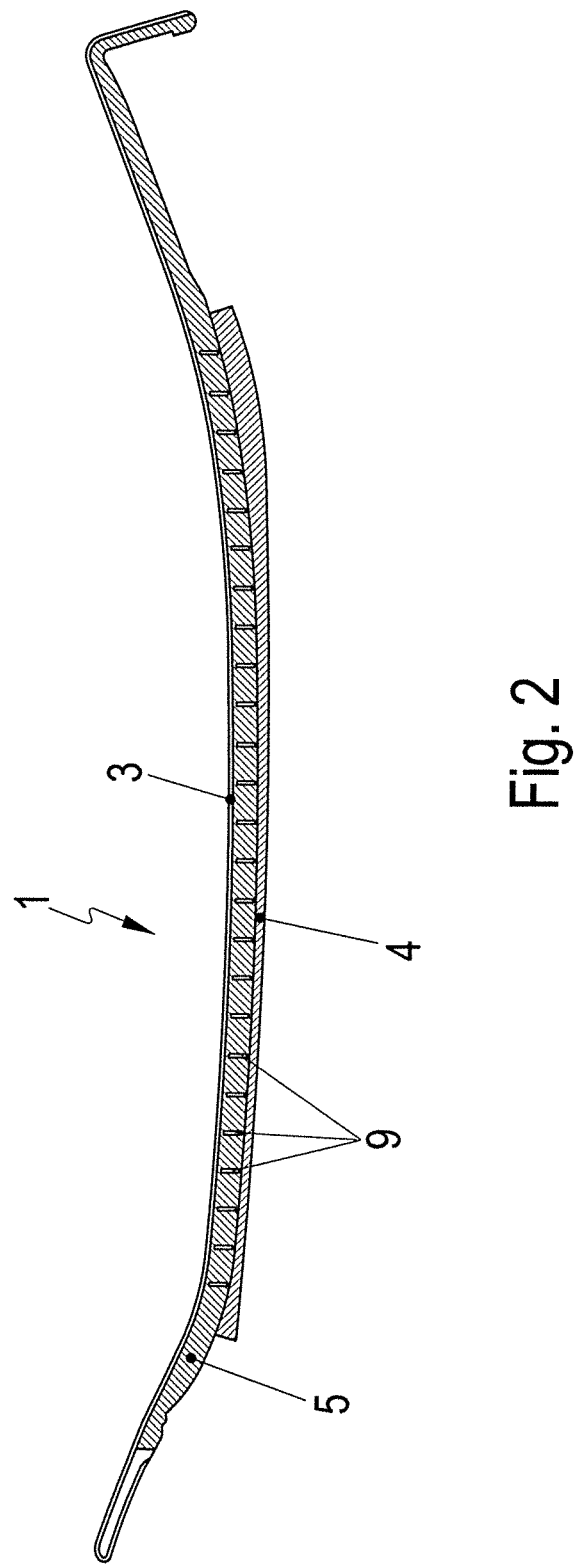
FIG. 2 is a section of the roof shell structure taken along the line II-II in FIG. 1.
Figure 3:
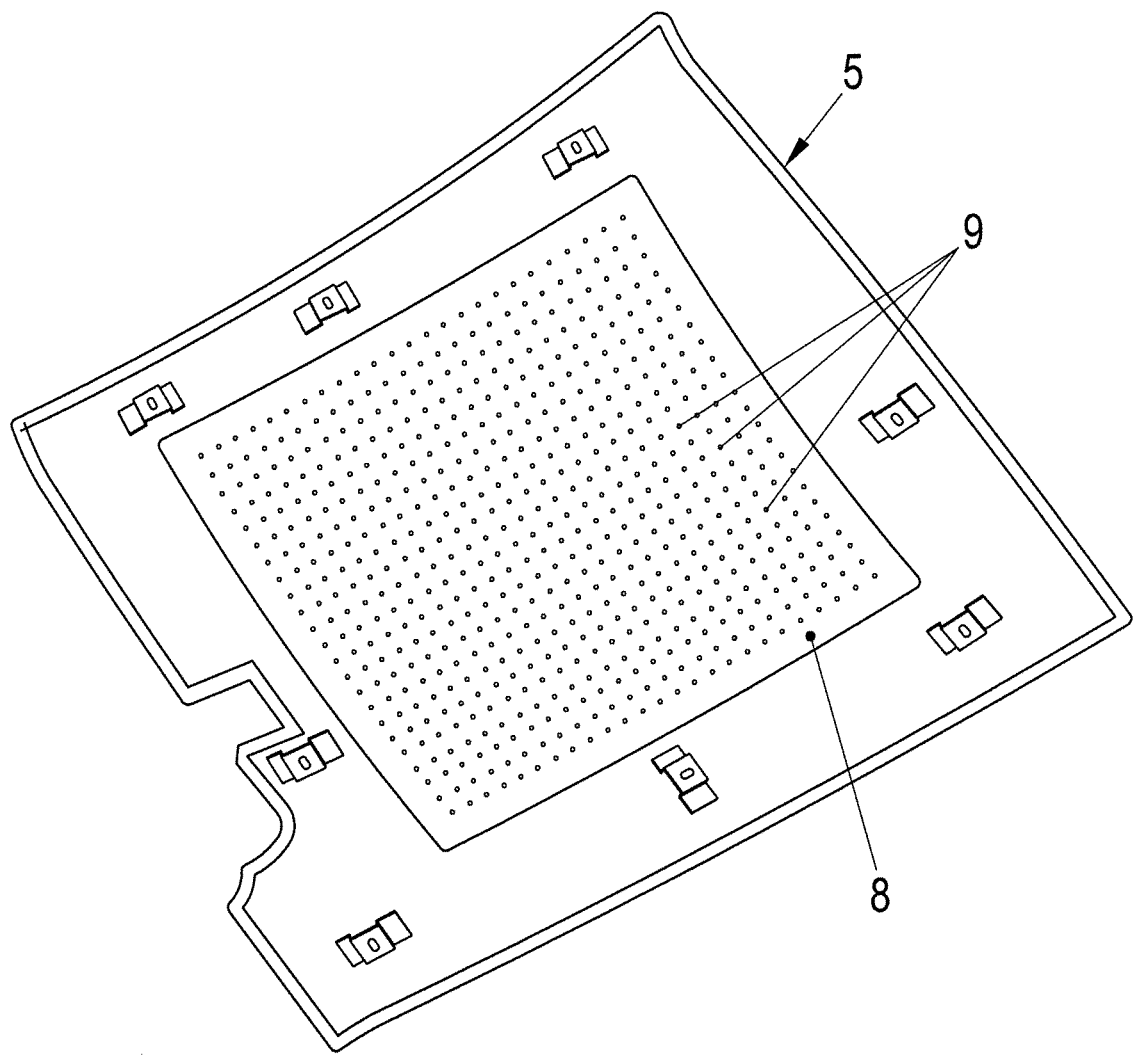
FIG. 3 is a view of the sound absorption element connected to the inner shell.

A vehicle has a roof shell structure comprising a roof shell 1 with an outer shell 2 and an inner roof lining 3 and an inner shell 4 having a sound absorption element 5 between the outer shell 2 and the inner roof lining 3 as illustrated in FIG. 1.

The sound absorption element 5 is connected firmly to the inner shell 4. Additionally, the sound absorption element 5 is arranged in the region of an opening 6 in the inner shell 4 and covers the opening 6 while being held on the surrounding edge 7 of this opening 6.

The sound absorption element 5 preferably is a sheet with a dish-like depression 8 that projects into the opening 6. The sound absorption element 5 has through-holes 9 or perforations distributed regularly over region of the opening 6.

Seals are arranged in holding strips 10 to provide sealing between the sheet-like sound absorption element 5 and the inner shell 4.

The outer shell 2, the inner shell 4 and the holding strips 10 preferably are made at least partly of a CFRP material and these elements 2, 4 and 10 are connectable by the RTM process.

The inner roof lining 3 consists of a headliner material in the manner of a textile lining.

In order to meet the high acoustic requirements, the integrally formed deformation elements are also produced from the headliner material.

What is claimed is:

1. A roof shell structure for a motor vehicle, comprising:
   an outer shell;
   an inner roof lining;
   an inner shell arranged between the outer shell and the inner roof lining, the inner shell having a substantially central opening; and
   a sound absorption element connected to the inner shell and covering the central opening, the sound absorption element having a depression projecting into the opening.

2. The roof shell structure of claim 1, wherein the sound absorption element has through-holes or perforations which are distributed regularly over the opening.

3. The roof shell structure of claim 1, further comprising seals between the sheet-like sound absorption element and the inner shell, the seals being connected to holding strips.

4. The roof shell structure of claim 3, wherein the outer shell, the inner shell and the holding strips for the seals comprise a carbon fiber reinforced plastic material and are bonded adhesively to one another by a resin transfer molding process.

5. The roof shell structure of claim 1, wherein the inner roof lining comprises a headliner material made of a textile lining.

* * * * *